United States Patent [19]

Sullivan

[11] Patent Number: 5,047,156
[45] Date of Patent: Sep. 10, 1991

[54] OIL RECOVERY VESSEL AND METHOD UTILIZING ADJUSTABLE WEIR

[75] Inventor: John L. Sullivan, Rossmoor, Calif.

[73] Assignee: Atlantic Richfield Company, Los Angeles, Calif.

[21] Appl. No.: 381,216

[22] Filed: Jul. 17, 1989

[51] Int. Cl.⁵ ............................................. E02B 15/04
[52] U.S. Cl. ..................................... 210/744; 210/97; 210/242.3; 210/248; 210/776; 210/923
[58] Field of Search ............. 114/14 R, 125; 210/104, 210/242.3, 416.5, 776, 744, 923, 97, 248

[56] References Cited

U.S. PATENT DOCUMENTS

| | | | |
|---|---|---|---|
| 3,554,152 | 1/1971 | Campbell et al. | 114/125 |
| 3,690,464 | 9/1972 | Heinicke | 210/242 |
| 3,744,257 | 7/1973 | Spanner . | |
| 3,774,567 | 11/1973 | Corvino et al. | 114/125 |
| 3,847,816 | 11/1974 | DiPerna | 210/242 |
| 3,884,807 | 5/1975 | Heddon | 210/104 |
| 3,929,644 | 12/1975 | Fletcher | 210/242 |
| 3,957,009 | 5/1976 | DiPerna | 114/74 R |
| 3,966,615 | 6/1976 | Petchul et al. | 210/242 |
| 4,033,876 | 7/1977 | Cocjin et al. | 210/242 |
| 4,067,811 | 1/1978 | Dallamore | 210/242 |
| 4,120,793 | 10/1978 | Strain | 210/175 |
| 4,257,889 | 3/1981 | Wöber et al. | 210/104 |
| 4,314,519 | 2/1982 | Yunoki et al. | 114/125 |
| 4,399,040 | 8/1983 | Ayers et al. | 210/923 |
| 4,554,070 | 11/1985 | Jordan | 210/923 |
| 4,653,421 | 3/1987 | Ayers et al. | 114/270 |

FOREIGN PATENT DOCUMENTS

| | | | |
|---|---|---|---|
| 16517 | 10/1980 | European Pat. Off. | 210/104 |
| 2398845 | 3/1979 | France | 210/242.3 |
| 525180 | 1/1977 | Japan | 210/242.3 |
| 4715309 | 12/1987 | Sweden | 114/125 |
| 596390 | 3/1978 | Switzerland | 210/242.3 |

Primary Examiner—Robert A. Dawson
Assistant Examiner—Joseph Drodge
Attorney, Agent, or Firm—Michael E. Martin

[57] ABSTRACT

A large-scale oil recovery vessel has a primary oil separation tank, secondary and tertiary separation tanks and plural oil storage tanks for receiving, separating and recovering oil from the sea. Oily water is admitted through bow openings in the vessel to a sluiceway and an adjustable height weir for skimming oil, debris and other pollutants from the seawater for discharge into the primary separation tank. Oily water is pumped from the primary separation tank to the secondary and tertiary separation tanks which are interconnected by a gravity flow conduit for gravity flow and separation of oil from water in each tank and gravity discharge of clean water overboard. The vessel may be constructed from a converted oil tanker and includes separate pumping systems for oil transfer and storage, water separated in the primary and secondary separation tanks and ballast water.

25 Claims, 5 Drawing Sheets

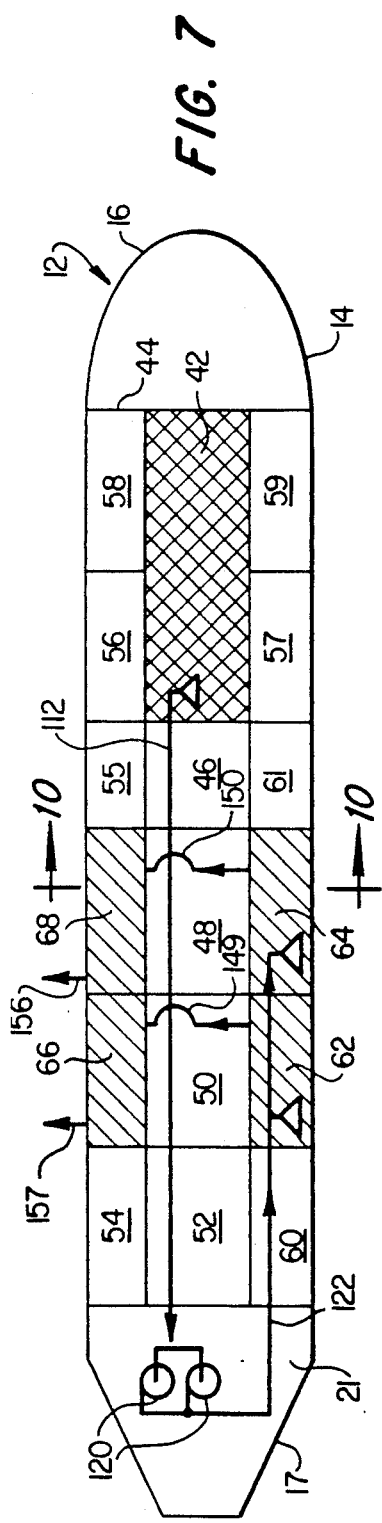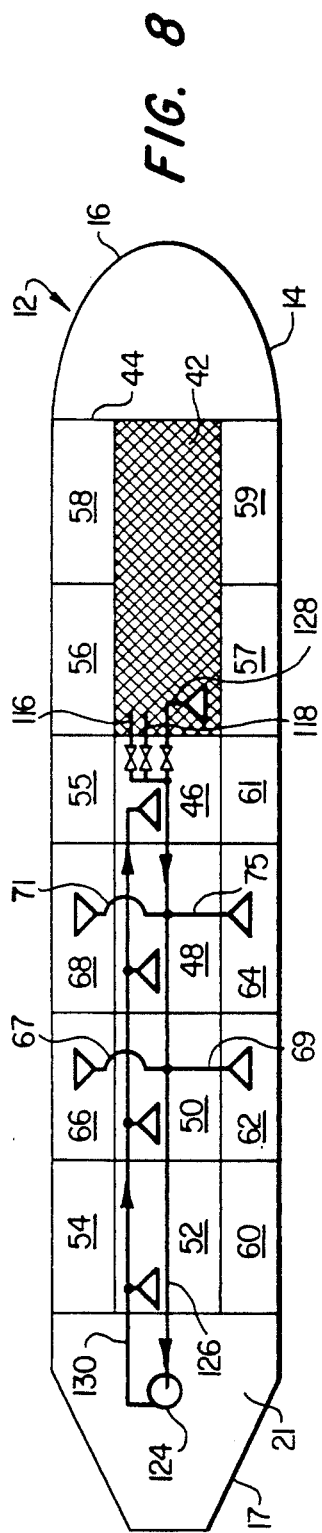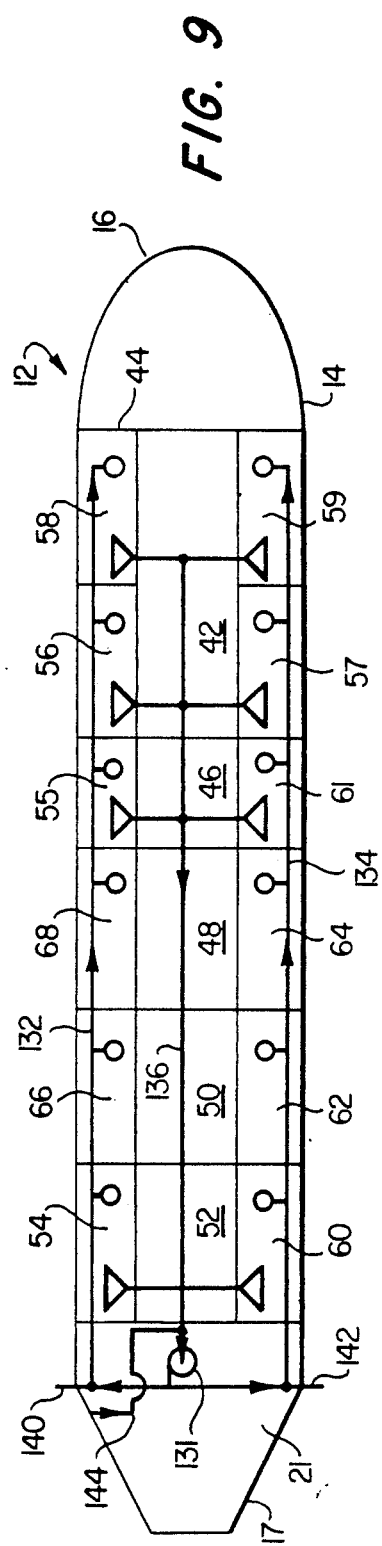

OIL RECOVERY VESSEL AND METHOD UTILIZING ADJUSTABLE WEIR

BACKGROUND OF THE INVENTION

1. Field of the Invention

The present invention pertains to a large, self-contained and self-propelled oil recovery vessel and a method for recovering large quantities of oil or other floating pollutants such as would be encountered in a large-scale marine oil spill, well blow-out or pipeline rupture.

2. Background

The increasing reliance on marine transportation of large quantities of crude oil and other substances considered to be marine pollutants and the infrequent but damaging accidents involving oil tankers such as those experienced by the Torrey Canyon, the Amoco Cadiz and the Exxon Valdez have made clear the need for a large-scale oil recovery system. The sudden disgorgement of large quantities of crude oil into the open sea such as caused by the above-mentioned accidents and the well blow-outs or failures which have occasionally occurred around the world have made it apparent that conventional oil spill recovery equipment and methods are inadequate.

Several proposals for oil recovery vessels or ships have been disclosed in the prior art such as in U.S. Pat. Nos. 3,690,464 to Heinicke, 3,744,257 to Spanner, 3,847,816 to DePerna, 3,884,807 to Heddon, 3,929,644 to Fletcher, 3,966,615 to Petchul et al, 4,033,876 to Cocjin et al, 4,067,811 to Dallamore, 4,120,793 to Strain, 4,257,889 to Wober et al, 4,308,140 to Pierson, Jr., and 4,653,421 to Ayers et al. These patents disclose various systems, some of which are alleged to be capable of open sea recovery of floating oil. However, none of the systems disclosed in these patents are particularly adapted to receive, rapidly process and store large quantities of crude oil or a similar type pollutant floating on the surface of the open sea or a similar large body of water.

Several requirements for a large-scale oil recovery vessel have become evident from experience with previous marine oil spills such as the tanker accidents mentioned hereinabove. The recovery vessel must be capable of ingesting and processing large quantities of oil covered seawater wherein the oil layer may be up to several inches thick and while minimizing the intake of unpolluted water. The vessel must be capable of recovery of oil, debris and similar floating pollutants from the sea surface with minimal agitation or mixing of the pollutant material with sea water. Accordingly, the shipboard oil and water handling facilities should be arranged and constructed such that a minimal amount of mixing of water and oil occur. If this objective is not achieved, the oil separation and storage capacity is severely limited and the vessel must be frequently offloaded to more capable separation equipment and larger storage facilities. The vessel must also be capable of temporarily storing large quantities of contaminated water to allow substantially complete separation of oil therefrom, and the vessel must store large quantities of separated oil so that operations of the vessel are not hindered by frequent excursions to a shore based pumpout station or interruption of recovery activities for lightering recovered oil to another storage vessel. Moreover, the vessel must be capable of recovering weathered as well as fresh oil equally well.

The shipboard water and oil handling capacity must be substantial so that large quantities of oil and water may be rapidly separated one from the other. Accordingly, the pumping capacity of the vessel must be adequate to ingest and move large quantities of oil covered water without affecting the trim or working draft of the vessel. Still further, the vessel must be capable of independent oil/water recovery and separation systems and processes in such a way that the different requirements of the systems do not compromise the effectiveness of each other.

Clearly, the length and breadth of the vessel must be substantial so that the vessel can operate in various sea states. Still further, the capital requirements for a vessel having the capabilities above mentioned are substantial and in this regard, and in accordance with the present invention, consideration should be given to the conversion of an existing ship such as a large crude oil carrier.

A review of the prior art mentioned above indicates that none of the references meet the desiderata mentioned herein nor, when viewed collectively, do they suggest the present invention which is summarized and described in detail hereinbelow.

SUMMARY OF THE INVENTION

The present invention provides a large-scale oil recovery vessel and a method for recovering relatively large quantities of crude and refined petroleum, floating debris and similar pollutants from a body of water. In accordance with one aspect of the present invention, there is provided a relatively large-scale oil recovery vessel having the capability of processing large volumes of oil covered seawater to separate oil from water in a continuous flow type process wherein oil and water are taken into the vessel, substantially oil free water is returned to the sea and recovered oil is stored within the vessel. The vessel has large storage capacity for recovered oil together with an arrangement of storage tanks and a distribution and separation system which provides for initial or primary separation of oil and water, together with secondary and tertiary separation processes with large volume capacity on board the vessel.

In accordance with another important aspect of the present invention there is provided a vessel which is capable of processing large quantities of oil covered seawater while minimizing mixing of the oil with the intake seawater. The vessel also includes a system which provides for secondary and tertiary separation processes which minimize the agitation or mixing of the oil with water and wherein oil-free water may eventually be dumped overboard.

In accordance with yet a further aspect of the present invention there is provided a large oil recovery ship which is adapted to have closable bow ports or openings into which oil covered seawater may enter and be skimmed by an adjustable height weir to minimize the ingestion and handling of clean water while taking in substantially all of the oil floating on the water. The adjustable height weir opens to a relatively large primary separation tank which is pumped at a substantially constant rate to remove the ingested oil and water. The adjustable height weir is operable to be adjusted to accommodate the draft of the vessel, minimize the intake of excessive amounts of seawater beneath the oil floating thereon and maintain a substantially constant liquid level in the primary separation tank. The present invention also provides an improved method of recovering oil covered or other floating debris for subsequent disposal or cleaning.

Still further, the present invention provides an improved shipboard system of separation tanks, storage tanks and ballast tanks for separating large quantities of oil from water, storing large quantities of oil and maintaining a minimal variation in draft of the vessel during oil recovery operations. The present invention also comprises a large-scale oil recovery vessel which may be provided through conversion of a crude oil carrier vessel or the like.

An important advantage of the present invention is provided by a system and method whereby a steady state condition is achieved for the intake of oil and contaminated water and discharge overboard of a substantially constant flow rate of oil free water. A constant liquid level is automatically maintained in a primary intake and separation tank by an adjustable height weir which is controlled by an automatic tank level gaging system, to maintain the constant liquid level. Water and oil are removed from the primary separation tank by separate pump systems.

Another important advantage of the present invention is provided by a system which does not require mechanical pumps or conveyors to actually remove the oil from the sea. The system and method of the present invention thus avoids the problems of mechanical breakdown and clogging of pumps and conveyor or screening equipment by heavy, weathered oil and other debris, such as has been experienced with many prior art recovery systems.

The above-noted features and superior aspects of the present invention together with other advantages thereof will be further appreciated by those skilled in the art upon reading the detailed description which follows in conjunction with the drawings.

BRIEF DESCRIPTION OF THE DRAWING

FIGS. 7 through 9 are plan views of the vessel including diagrams of the tank and pumping system arrangements for the separation, transfer, storage and ballasting systems of the vessel.

DESCRIPTION OF A PREFERRED EMBODIMENT

Figure 1:
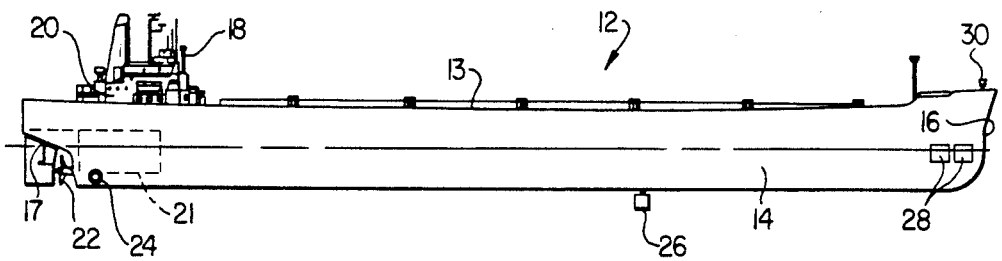
FIG. 1 is a side elevation of an oil recovery vessel generally in accordance with the present invention.

In the description which follows, like parts are marked throughout the specification and drawing with the same reference numerals, respectively. The drawing figures are not necessarily to scale and certain features may be shown in schematic or somewhat simplified form in the interest of clarity and conciseness.

Referring to FIG. 1 there is illustrated a side elevation of a large oil recovery vessel in accordance with the present invention. The oil recovery vessel or ship, generally designated by the numeral 12, may be similar in some respects to a large crude oil carrier and may, for example, be converted from such a ship. The vessel 12 preferably comprises a single displacement hull 14 having a conventional bow 16, stern 17, aft disposed navigation bridge 18 and crew quarters 20. The vessel 12 is preferably adapted to have a propulsion system of conventional construction disposed in an engine room 21 and driving at least one screw propeller 22. To facilitate maneuvering during oil recovery operations, at least one lateral propulsion or thrust unit 24 is disposed aft, and forward mounted, retractable azimuth type thruster units 26, one shown, are provided for use during oil recovery as well as docking operations. To be effective in recovering oil from a major marine oil spill or well blow-out, the ship 12 is preferably of a size in at least the 70,000 deadweight tonnage class with an overall length of approximately 800 feet or more and a beam of approximately 100 feet. The ship 12 may, for example, be adapted from a commercial vessel such as the S. S. ARCO Prudhoe Bay or the S. S. ARCO Sag River, both 70,000 dwt class oil carriers. As will be described herein, the ship 12 is modified to include an oil recovery inlet area in the bow 16 comprising one or more generally rectangular openings 28, two shown in FIG. 1, which extend vertically above and below the waterline when at operating draft as an oil recovery ship. To aid in maneuvering the ship 12 in darkness, one or more floodlights 30 are preferably disposed forward for conducting night operations.

Figure 2:
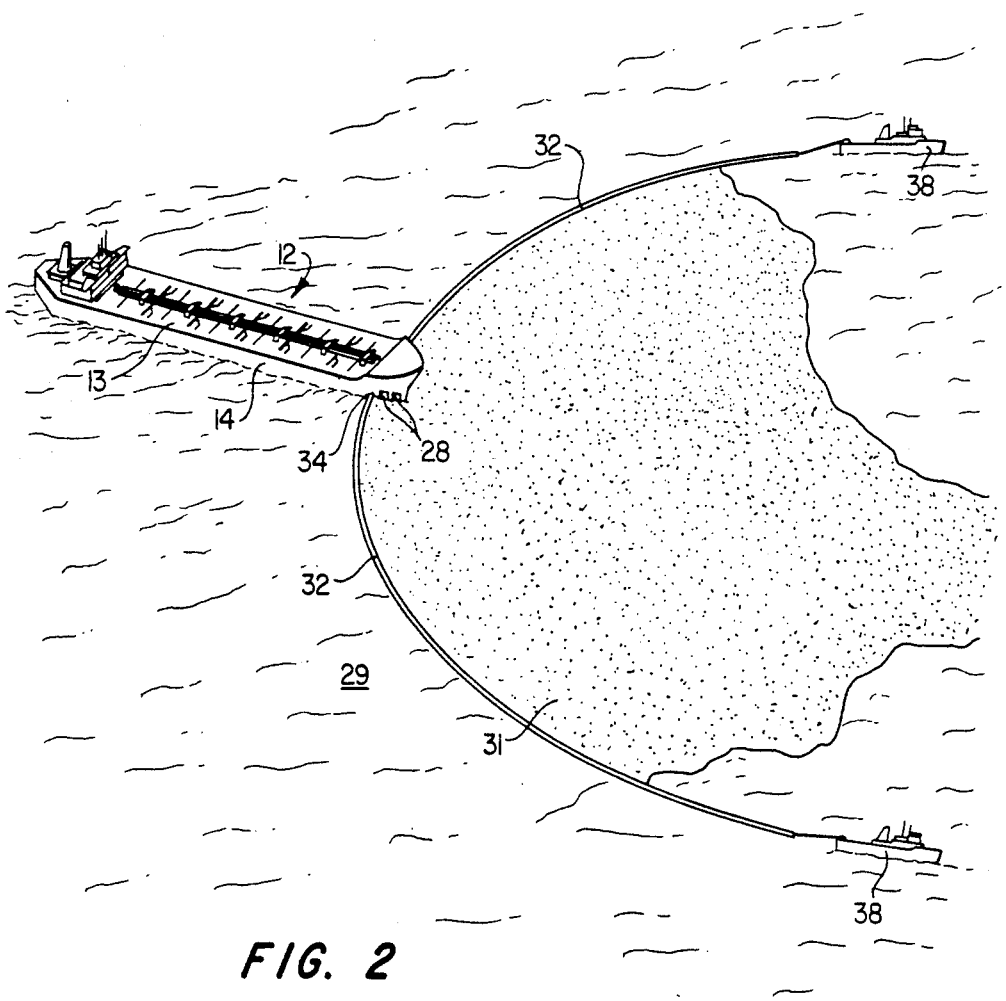
FIG. 2 is a perspective view showing the oil recovery vessel in operation to recover oil floating on a large body of water.

As will be explained in further detail herein, the ship 12 may be operated in company with suitable oil gathering or containment booms to take in oil covered seawater through the openings 28. The openings 28 are normally closed by retractable doors when the ship is in transit. As illustrated in FIG. 2, in the event of a situation wherein the sea 29 is covered with a relatively large quantity of oil 31, opposed floating containment booms 32 may be connected to the ship 12 at suitable attachment points 34 on the forward sides of the hull 14, see FIG. 4 also. The booms 32 are connected at their opposite ends to smaller motor vessels 38 operating as towing vessels for the booms. The booms 32 may be stowed forward on the ship 12 and deployed through the openings 28 when needed for containment operations. Alternatively, the booms 32 and the towing vessels 38 may be stowed on the main deck 13 and deployed or retrieved by suitable hoisting means, not shown, disposed on the ship.

Referring briefly to FIG. 7, the hull 14 of the ship 12 is divided into a series of storage, separation, and ballast tanks by conventional bulkheads and longitudinal interior sidewalls. A primary, oily water receiving and separation tank 42 is disposed forward in the hull 14 behind a transverse bulkhead 44 and a series of oil storage tanks 46, 48, 50 and 52 are disposed amidships and aft of the tank 42. A series of variable ballast tanks 54, 55, 56, 57, 58, 59, 60 and 61 are arranged outboard of the aforementioned storage tanks along opposite sides of the ship 12 and at least four secondary and tertiary separation tanks 62, 64, 66 and 68 are disposed also along opposite sides of the ship 12. For converting the above-mentioned commercial ships to the ship 12 the primary storage tanks and the primary and secondary separation tanks would collectively have an oil storage capacity of approximately 300,000 barrels (42 U.S. gal./bbl) and a total oil storage capacity, utilizing the ballast tanks, of over 550,000 barrels.

Figure 3:
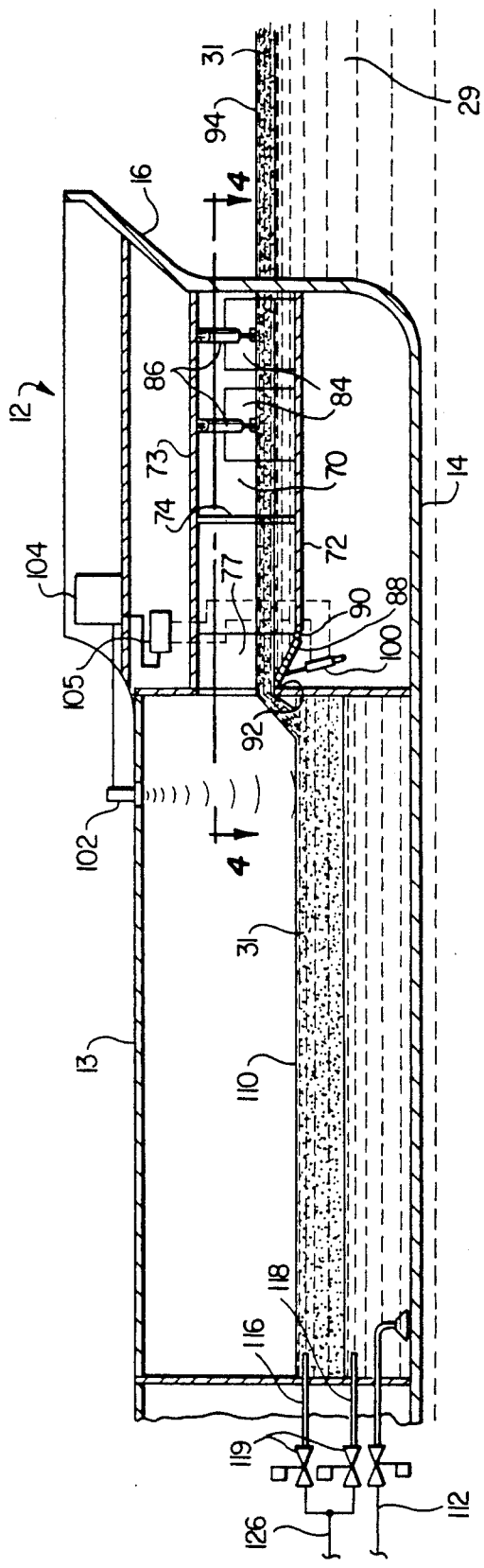
FIG. 3 is a longitudinal vertical central section view in somewhat schematic form of the bow area of the vessel.
Figure 4:
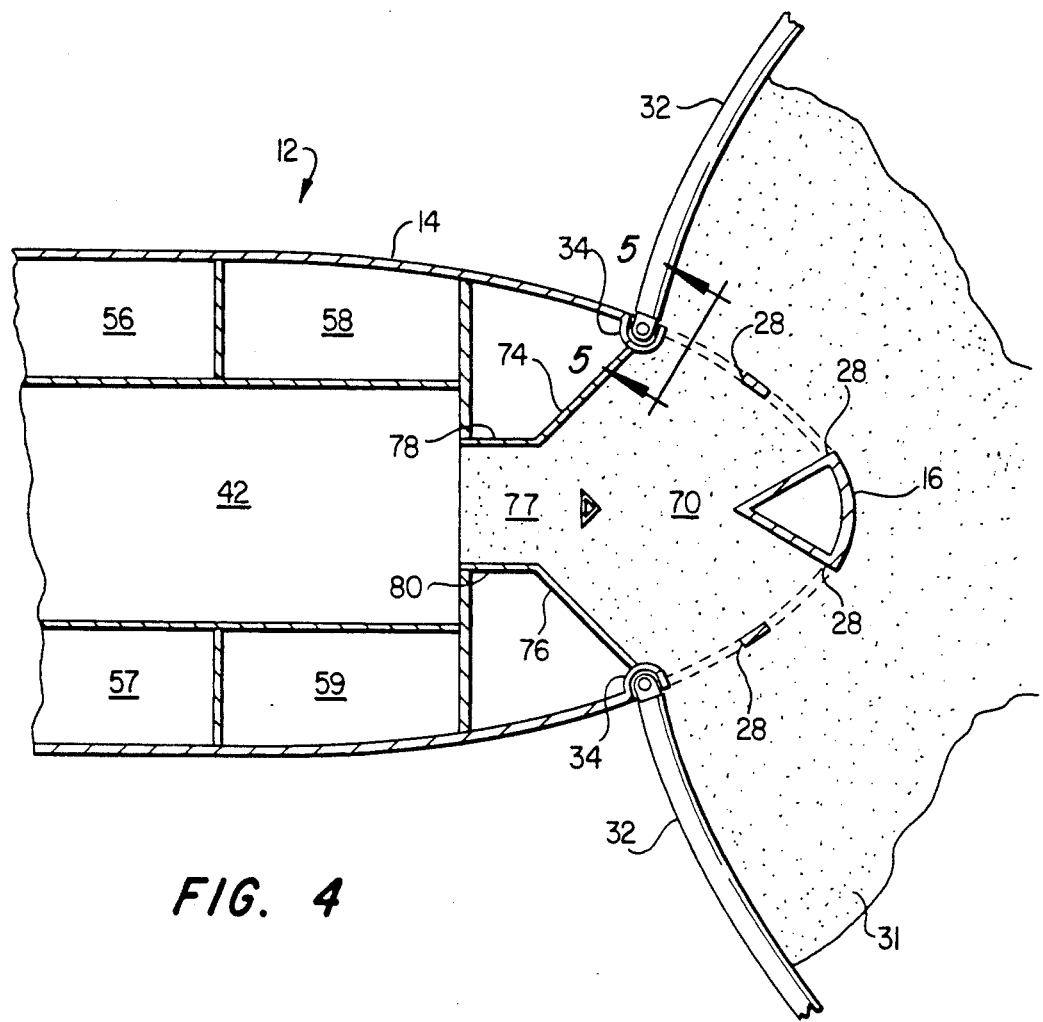
FIG. 4 is a section view taken generally along the line 4—4 of FIG. 3.
Figure 5:
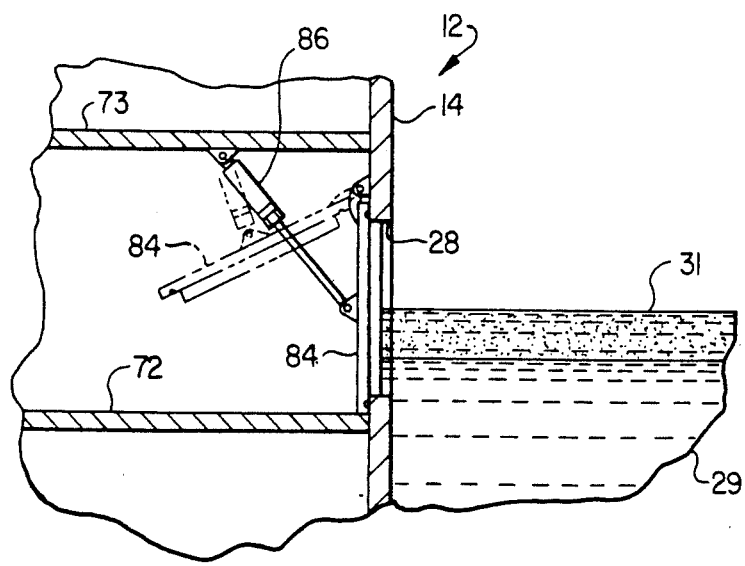
FIG. 5 is a detail section view taken along the line 5—5 of FIG. 4.

Referring now to FIGS. 3 and 4, the ports or openings 28 in the bow 16 open into a chamber 70 which may be delimited by generally horizontal decks 72 and 73 and angled bulkheads 74 and 76, FIG. 4, which converge toward a sluiceway or channel 77 formed by opposed sidewalls 78 and 80. The sluiceway 77 opens into the primary separation tank 42. As shown in FIG. 4, plural openings 28 are formed on opposite sides of the bow 16 and open into the chamber 70. As shown by way of example in FIG. 5, each of the openings 28 may be closed by a door 84 which is suitably hinged to the hull 14 for pivotal movement between open and closed positions by operation of a suitable hydraulic actuator 86, for example. Each of the doors 84 may be formed with suitable seal means and latching means for assuring that the doors remain closed and watertight when the ship 12 is in transit. The doors 84 may be adapted to operate as vertical or horizontal sliding doors or hinged to open outwardly of the hull 14 to form part of the collection or containment boom system. When the ship is operating to recover quantities of oil from the sea, the doors 84 are pivoted to an open position to permit oily seawater to enter the chamber 70 and the sluiceway 77.

Figure 6:
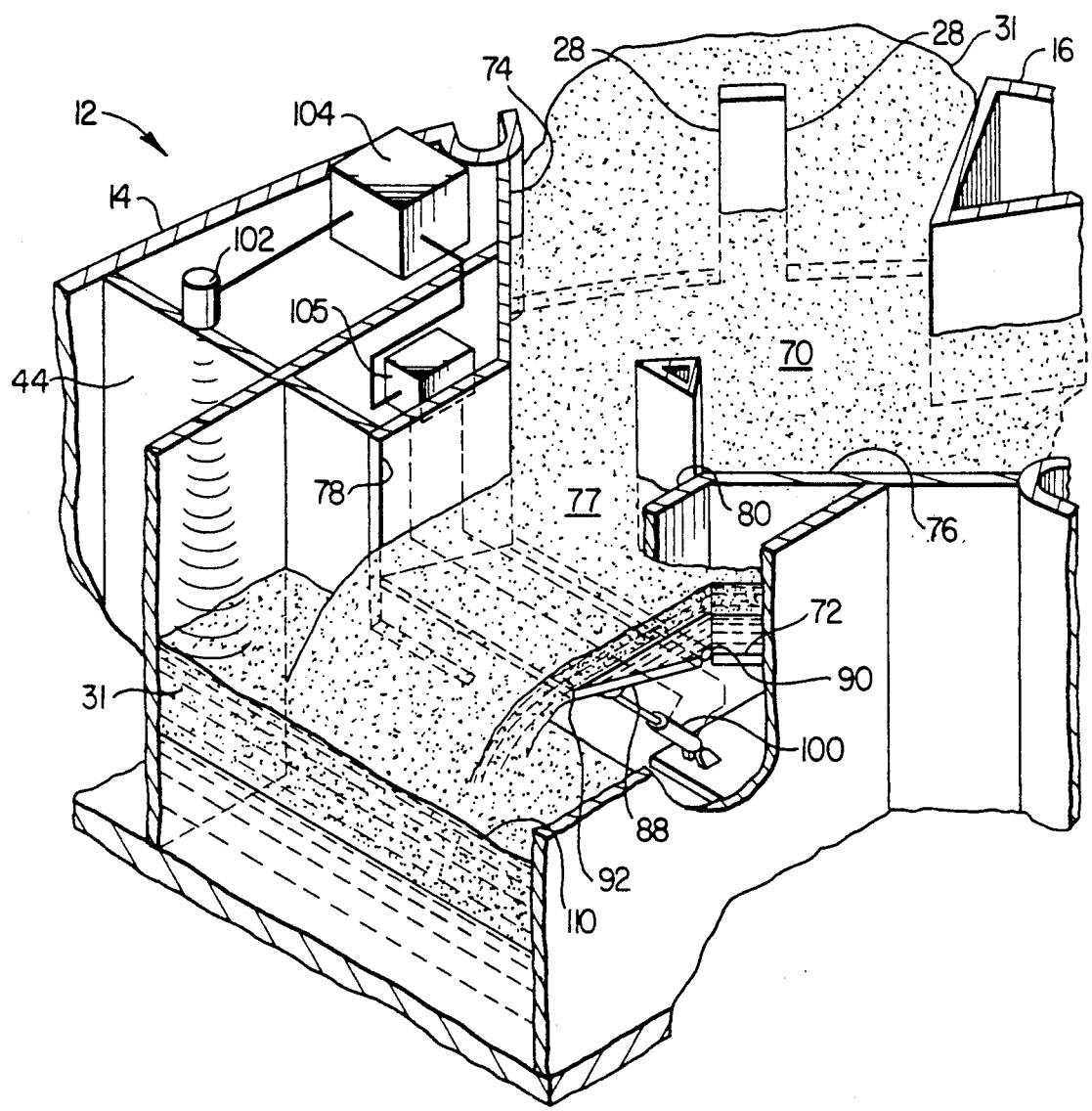
FIG. 6 is a perspective view in somewhat schematic form of the variable height weir leading from the inlet chamber to the primary separation tank.

Referring now to FIG. 6, a movable weir 88 is disposed between the sidewalls 78 and 80 and is hinged for movement about a generally horizontal transverse axis 90. The weir 88 may comprise a movable portion of the deck 72, as shown, or formed as a vertically movable bulkhead section disposed between suitable guides. The weir 88 may be positioned such that a transverse lip or edge 92 is vertically adjustable to control the flow of oil and water into the primary separation tank 42. In fact, the height of the weir edge 92 is preferably controlled so that substantially only the entire layer 94 of oil 31, FIG. 3, and other floating debris on top of the sea 29 is skimmed off or flows into the tank 42. As a practical matter, of course, in order to assure that all of the oil is skimmed or allowed to flow over the weir edge 92, a certain amount of seawater must also be admitted to the separation tank 42. Moreover, in any sea state but a dead calm, wave action and relative motion of the ship 12 with respect to the oil covered sea may cause a substantial amount of seawater to be taken on by the separation tank 42. As shown in FIG. 6, the height of weir edge 92 may be controlled by suitable actuator means such as one or more hydraulic cylinder actuators 100, one shown. The actuators 100 are preferably controlled to cause the weir 88 to maintain a predetermined level of liquid in the storage tank by a tank gaging apparatus 102 which is adapted to deliver control signals to a controller 104 for operating the actuators 100 through suitable valve means 105. The height of the edge 92 is adjusted so as to maintain a substantially constant level of liquid in the tank 42.

The tank 42 is of substantial capacity, namely, with respect to a ship of the dimensions mentioned hereinabove, approximately 90,000 barrels. As shown in FIGS. 3 and 6, the level of liquid maintained in the tank 42 is preferably, as indicated at the line 110, only slightly below or relatively even with the deck 72. In this way the liquid entering the tank 42 is not severely agitated or mixed, which action would tend to form an emulsion or other oil-water mixture. In fact, separation at least as great as is already provided by the oil layer 94 on the surface of the sea 29 should be maintained or improved on by allowing liquid entering the tank 42 to settle so that gravitational separation of the oil and water may occur or remain largely undisturbed.

Liquids must, of course, be removed from the tank 42 at a fairly significant rate. Referring to FIG. 3, a water suction conduit 112 is provided and enters the tank 42 at a relatively low elevation in the tank. Plural oil removal suction conduits 116 and 118 also enter the tank 42 at selected elevations and are provided with remote controlled valves 119 interposed therein, respectively, for controlling which conduit is operable to remove oil 31 from the tank.

Referring again to FIG. 7, water is removed from the tank 42 by way of the suction conduit 112 which is connected to one or more pumps 120. The pumps 120 are adapted to selectively discharge water to the secondary separation tanks 62 and 64. Conventional valving is interposed in a discharge conduit 122 for controlling the flow to the tanks 62 and 64 but is deleted from the diagram of FIG. 7 in the interest of clarity. Suffice it to say that the pump discharge conduit 122 may be adapted to selectively discharge oily water into the tanks 62 and 64 at will. The pumps 120 are preferably disposed aft and below deck in a suitable pump or machinery space in or adjacent to the engine room 21.

Referring to FIG. 8, also disposed aft in the pump space is an oil transfer pump 124 which is connected to the suction conduits 116 and 118 by way of a conduit 126, which, as shown in FIG. 8, may have an inlet portion 128 entering the bottom of the tank 42 for removal of any oil disposed thereat. The pump 124 is connected to a discharge conduit 130 which is operable to be in communication with the storage tanks 46, 48, 50 and 52. The pump 124 is also in communication with the separation tanks 62, 64, 66 and 68 for transfer of oil from these tanks by way of conduit 126 and branch suction conduits 67, 69, 71 and 75, respectively. As previously mentioned, control valves interposed in each of the conduits leading to the respective storage tanks 46, 48, 50 and 52 and control valves connected to the suction conduits for each of the separation tanks 62, 64, 66 and 68 may be interposed in the conduit circuit for the pump 124 for controlling the flow to the storage tanks and from the separation tanks at will.

As shown schematically in FIG. 9, a ballast water pumping system for the ship 12 includes a ballast pump 131, also preferably disposed in the engine room pump space, and which is suitably connected to the ballast tanks 54, 55, 56, 57, 58, 59, 60 and 61 for adding ballast water by way of discharge conduits 132 and 134 and removing ballast water from these tanks by way of a suction conduit 136 and suitable branch conduits connected thereto and to each of the respective ballast tanks. Ballast water may also be pumped into the separation tanks 62, 64, 66 and 68 as needed. Ballast water may be discharged overboard by way of discharge lines 140 and 142 and seawater ballast may be added by way of a seawater suction conduit 144 which may also be interconnected to the pump 131 by way of the main suction conduit 136. As mentioned above, suitable control valves would be provided in the branch conduits leading to the suction conduit 136 and the branch conduits leading from the discharge conduits 132 and 134 for controlling the flow of ballast water to and from the respective ballast and separation tanks. In like manner suitable control valves would be interposed in the pump discharge lines 140 and 142 and the ballast water suction conduit 144 for selective control of flow of ballast water to and from the pump 131. The provision of control valves for each of the diagrams of FIG. 7, FIG. 8 and FIG. 9 are believed to be within the purview of one of ordinary skill in the art and are omitted from these piping diagrams in the interest of clarity and conciseness.

Figure 10:
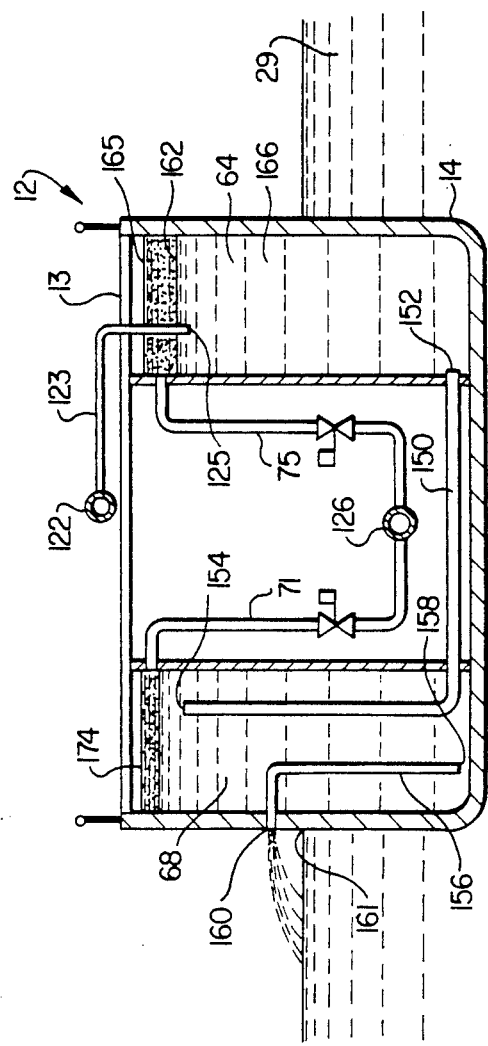
FIG. 10 is a section view taken generally along the line 10—10 of FIG. 7.

Referring now to FIG. 7, and also FIG. 10 by way of example, the secondary separation tanks 62 and 64 are interconnected with the tertiary separation tanks 66 and 68, respectively, by crossover conduits 149 and 150. As shown in FIG. 10, the conduit 150 has an inlet 152 located approximately at the bottom of the tank 64 and an outlet 154 located in the upper region of the tank 68. The tank 68 is provided with an overboard water discharge conduit 156 having an inlet 158 located adjacent the bottom of the tank 68 and an outlet portion 160 exterior of the ship 12 and above the waterline 161 at all recovery operating draft conditions of the ship. Conduits 149 and 157 for the tanks 62 and 66 are arranged with respect to these tanks the same as conduits 150 and 156 are arranged in the tanks 64 and 68.

Referring to FIG. 10, oily water is admitted to the tank 64 from the pump discharge conduit 122 by way of a branch conduit 123 having an outlet 125 just below an oil-water interface 162. Oily water entering the tank 64 is allowed to settle and separate water from oil by gravity so that a layer of oil 165 forms on top of the water 166 in the tank. By the provision of the crossover conduit 150, the level of liquid in the tanks 64 and 68 will be in equilibrium and, accordingly, discharge of oily water into the tank 64 will cause flow from the bottom of the tank 64 of relatively oil-free water to the tank 68. Thanks to the provision of the discharge crossover conduit 150 having a discharge outlet 154 near the surface of the liquid in the tank 68, any oil remaining in the liquid which crosses over from the tank 64 to the tank 68 will have a good opportunity to separate and float to the surface to form an oil layer 174. Moreover, the operating liquid levels in the tanks 64 and 68 are maintained above the conduit outlet 160 so that gravity discharge of clean seawater is provided. The level of liquid in both of the tanks 64 and 68 may be controlled by allowing discharge of substantially oil-free water from the tank 68 through the conduit 156 which, preferably, has its inlet 158 near the bottom of the tank to preclude discharging any oil to the sea. Suitable control valves, not shown may be interposed in the conduits 149, 150, 156 and 157 for controlling flow therethrough.

Oil or a similar pollutant which is separated from water in the secondary and tertiary separation tanks may be skimmed from the surface of liquid in the tanks by operation of the pump 124 to selectively withdraw oil from the tanks 62, 64, 66 and 68 by way of the respective suction conduits described above and which open into these tanks. The arrangement of the tanks 62 and 66, with respect to each other, is identical to that of the tank 64 with respect to the tank 68 so that secondary and tertiary separation may occur simultaneously in the respective sets of tanks. Although removal of oil from the tanks 62, 64, 66 and 68 is illustrated to be by suction conduits connected to the oil transfer and storage pump 124, other oil skimming or removal means may be employed for the removal of oil from these tanks as well as from the primary separation tank 42.

In operation to remove a large quantity of oil 31 disposed on the surface of a body of water 29 the ship 12 would be maneuvered into position and the containment booms 32 and their respective tow vessels 38 deployed to confine the quantity of oil or other pollutant on the water surface to an area that can be covered by maneuvering the ship 12. Prior to commencing recovery operations, the ship 12 would be ballasted to a suitable draft which would permit entry of oil or other pollutant covered seawater into the chamber 70 through the openings 28. The movable weir 88 would be adjusted to permit movement of all of the oil and other floating pollutants and debris over the edge 92 into the tank 42. Thanks also to the arrangement of the openings 28 and chamber 70 the oil covered water is calmed somewhat before encountering the weir 88. The level of liquid in the tank 42 is then allowed to rise to and be maintained at a predetermined depth by the pumps 120 which would be started to transfer water to the secondary tanks 62 and 64 and the pump 124 started to transfer oil from the tank 42 to selected ones of the storage tanks 46, 48, 50 or 52. It is contemplated that the pumping capacity of the pumps 120 would be, for a ship of the dimensions described herein, on the order of 35,000 barrels per hour whereby concentrated oil slicks from an incident of the magnitude of the major marine oil spills experienced in the past could be recovered in anywhere from less than a 24-hour period to no more than 7 or 8 days.

As the secondary and tertiary separation tanks are filled and the liquid therein allowed to settle for further separation of oil from water, the liquid levels in these tanks would automatically equalize and the discharge of seawater from the conduits 156 and 157 would automatically commence as the level rose above the conduit discharge outlets. The continuous collection of oil from the tanks 42, 62, 64, 66 and 68 and transfer to a selected storage tank would be offset by discharge of ballast water from one or more of the ballast tanks to maintain the ship 12 at a working draft and trim which would not vary more than about five feet. Once the amidships storage tanks 46, 48, 50 and 52 were filled, the secondary separation tanks 62 and 64 could be used as storage tanks by the accumulation of oil in these tanks through continued operation of the system as described hereinabove. If draft variation permitted, the ballast tanks might also be used as oil storage tanks.

From the foregoing, it will be appreciated that the present invention provides a seagoing oil recovery vessel which has relatively rapid, continuous and large-scale recovery rate capability including the ability to process oil covered water at a rate of about 25,000 to 35,000 barrels per hour. The unique on-board separation system which minimizes the agitation or mixing of oil with water provides a simplified yet effective separation and recovery technique which does not require mechanical separation means and minimizes the amount of pumping and/or mixing of multiphase liquids. The systems is also relatively unaffected by the ingestion of oiled or otherwise contaminated debris from the sea surface. A vessel converted from a commercial oil carrier of the type mentioned hereinabove would be suitable for remote, deep and open sea operation in sea states up to, possibly, gale conditions. The ship 12 may be adapted to be used as a command ship and to store auxiliary recovery equipment such as the containment booms and tow vessels associated therewith. Moreover, the method of recovery of oil as described in connection with the ship 12 provides a simplified yet effective separation and recovery technique.

Although the configuration of containment booms 32, bow openings 28, sluiceway 77 and weir 88 described herein in conjunction with the ship 12 may take various forms, the concept of providing a large primary separation tank on board for receiving relatively large quantities of oil covered water and floating debris, the transfer of separated oil and water to storage and to secondary and tertiary separation processes provides a unique recovery method and system heretofore unappreciated in the prior art. Moreover, although a preferred embodiment of the present invention has been described in detail herein, those skilled in the art will recognize that various substitutions and modifications may be made to the embodiment described without departing from the scope and spirit of the invention as recited in the appended claims.

What is claimed is:

1. A seagoing oil recovery vessel for recovering relatively large quantities of oil or a similar pollutant disposed on or near the surface of the sea, said vessel comprising:
   a hull including a bow, a stern and propulsion means for maneuvering said vessel;
   at least one primary separation tank disposed within said vessel, at least one secondary separation tank disposed within said vessel, and at least one oil storage tank disposed within said vessel;
   first pump means for transferring oil from said separation tanks to said storage tank and means for transferring water separate from oil in said primary separation tank to said secondary separation tank;
   means forming a sea calming chamber in said hull in communication with said primary separation tank for receiving oil covered seawater;
   means forming openings in said hull at the operating waterline of said vessel for admitting oil covered seawater to said chamber; and
   means forming an adjustable weir interposed between said chamber and said primary separation tank for controlling the flow of oil covered water into said primary separation tank for recovering oil from the surface of the sea by gravitational separation of oil from water in said primary separation tank and said secondary separation tank.

2. The vessel set forth in claim 1 wherein:
   said means for transferring water from said primary separation tank to said secondary separation tank comprises second pump means.

3. The vessel set forth in claim 2 wherein:
   said secondary separation tank is connected to said second pump means by conduit means which opens into said secondary separation tank at a point near the surface of liquid in said secondary separation tank.

4. The vessel set forth in claims 1 or 3 including:
   a tertiary separation tank on said vessel for separating oil from water which has undergone secondary separation in said secondary separation tank;
   crossover conduit means interconnecting said secondary separation tank and said tertiary separation tank for conducting water which has separated from oil in said secondary separation tank to said tertiary separation tank; and
   discharge conduit means for discharging water from said tertiary separation tank overboard.

5. The vessel set forth in claim 4 wherein:
   said crossover conduit means includes an inlet in said secondary separation tank which is near the bottom of said secondary separation tank and an outlet which is near the top of said tertiary separation tank.

6. The vessel set forth in claim 4 wherein:
   said discharge conduit means includes an inlet near the bottom of said tertiary separation tank.

7. The vessel set forth in claim 4 wherein:
   said secondary separation tank and said tertiary separation tank are disposed substantially athwartships from each other.

8. The vessel set forth in claim 1 including:
   means for adjusting the height of said weir to control the flow of oil covered seawater into said primary separation tank and control means including level gaging means for adjusting the height of said weir to maintain a substantially constant level of liquid in said primary separation tank during operation of said vessel to recover oil from the sea.

9. The vessel set forth in claim 1 wherein:
   said means forming said opening are in the bow of said vessel and said primary separation tank is disposed substantially amidships and forward in said vessel.

10. The vessel set forth in claim 9 including:
    ballast tanks disposed in said vessel outboard of said storage tank, and pump means for transferring ballast to and from said ballast tanks during operation of said vessel to recover oil from the sea.

11. The vessel set forth in claim 1 including:
    a plurality of storage tanks arranged amidships and aft of said primary separation tank, and said first pump means for transferring oil from said primary separation tank includes discharge conduit means for discharging separated oil into said plurality of storage tanks.

12. The vessel set forth in claim 11 including:
    plural secondary separation tanks and plural tertiary separation tanks on said vessel, each of said secondary separation tanks being in flow communication with a tertiary separation tank to form plural pairs of inter-connected secondary and tertiary separation tanks arranged on opposite sides of said storage tanks.

13. A large-scale oil recovery vessel characterized as a converted tank ship having a hull, a bow portion, a stern, propulsion means for maneuvering said vessel and a plurality of tanks formed in said vessel, said tanks including a primary oil and water separation tank disposed generally forward on said vessel, means forming a sluiceway opening into said primary separation tank, means forming openings in the hull of said vessel and in communication with said sluiceway for conducting oil covered seawater to said primary separation tank and means forming an adjustable weir interposed in said sluiceway for controlling the flow of oil and water into said primary separation tank;
    at least one secondary separation tank and at least one tertiary separation tank in said vessel, means for placing said secondary separation tank in flow communication with said primary separation tank for receiving seawater separated from oil in said primary separation tank;
    a crossover conduit interconnecting said secondary and tertiary separation tanks and a discharge conduit in communication with said tertiary separation tanks for discharging seawater from said tertiary separation tank whereby, as oil water is pumped into said secondary separation tank to allow separation of oil from water, separated water flows to said tertiary separation tank for tertiary separation of oil from water, and water separated in said tertiary separation tank is discharged overboard through said discharge conduit, the transfer of water from said secondary separation tank to said tertiary separation tank and overboard discharge of said water being conducted by gravity flow.

14. The vessel set forth in claim 13 wherein:
said secondary separation tank and said tertiary separation tank are disposed generally along opposite sides of said vessel from each other.

15. The vessel set forth in claim 13 including:
means in communication with said secondary and tertiary separation tanks for transferring oil separated in said secondary and tertiary separation tanks to an oil storage tank on said vessel.

16. A large-scale oil recovery vessel for collecting oil covering the surface of a sea, said vessel comprising:
a hull having generally a configuration of a liquid carrier including a bow, a stern and propulsion means for maneuvering said vessel;
a plurality of oil storage tanks disposed amidships on said vessel between said bow and said stern;
at least one primary oil separation tank on said vessel disposed forward of said oil storage tanks;
means forming a plurality of openings in said hull at said bow and means forming a sluiceway in said vessel between said openings and said primary separation tank for receiving oil covered seawater from said openings;
means forming a weir in said sluiceway having a generally horizontal edge for controlling the flow of oil covered water from said sluiceway into said primary separation tank;
a plurality of ballast tanks arranged in said vessel along opposite sides of at least one of said primary separation tank and said oil storage tanks; and
secondary separation tank means arranged along at least one side of said vessel.

17. The vessel set forth in claim 16 including:
tertiary separation tank means on said vessel for separating oil from water which has undergone secondary separation in said secondary separation tank means and disposed along a side of said vessel opposite said secondary separation tank means;
crossover conduit means interconnecting said secondary separation tank means and said tertiary separation tank means for conducting water which has separated from oil in said secondary separation tank to said tertiary separation tank; and
discharge conduit means for discharging water from said tertiary separation tank means overboard.

18. The vessel set forth in claim 17 wherein:
said crossover conduit means includes an inlet in said secondary separation tank means which is near the bottom of said secondary separation tank means and an outlet which is near the top of said tertiary separation tank means.

19. The vessel set forth in claim 17 including:
actuator means for adjusting the height of said weir to control the flow of oil covered seawater into said primary separation tank, and control means including level gaging means for operating said actuator means to adjust the height of said weir to maintain a substantially constant level of liquid in said primary separation tank during operation of said vessel to recover oil from the sea.

20. A method for recovering relatively large quantities of oil or a similar pollutant disposed on the surface of a body of water comprising the steps of:
providing a large oil recovery vessel having a hull, a bow, a stern and a plurality of compartments formed in said hull and comprising at least one of each of a primary oil separation tank, a secondary oil separation tank, and an oil storage tank, means forming an opening in said hull and in flow communication with means forming a sluiceway, and an adjustable height weir interposed in said sluiceway between said opening in said hull and said primary separation tank for controlling the flow of oil covered water to said primary separation tank;
maneuvering said vessel at a draft sufficient to ingest oil covered seawater through said opening into said sluiceway and adjusting the height of said weir so as to skim oil from said seawater for flow into said primary separation tank and maintaining a quantity of oil and seawater in said primary separation tank sufficient to allow substantial gravity separation of oil from water taken in through said opening;
removing oil and water from said primary separation tank; and
maintaining a substantially constant level of liquid in said primary separation tank.

21. The method set forth in claim 20 including the steps of:
sensing the level of liquid in said primary separation tank; and
operating said means for controlling the flow of oil covered water into said primary separation tank to maintain said substantially constant level of liquid in said primary separation tank.

22. The method set forth in claim 20 including the step of:
pumping oil from said primary separation tank to said storage tank.

23. The method set forth in claim 20 including the step of:
pumping water from said primary separation tank to said secondary separation tank for gravity separation of oil remaining in said water; and
maintaining a level of liquid in said secondary separation tank so as to provide for gravity discharge of clean water overboard from said vessel and which is removed from said secondary separation tank.

24. The method set forth in claim 23 wherein:
said vessel includes a tertiary separation tank in flow communication with said secondary separation tank for receiving water separated from oil in said secondary separation tank, and said method includes the step of;
conducting water from said secondary separation tank to said tertiary separation tank for gravity separation of oil from water in said tertiary separation tank.

25. The method set forth in claim 24 including the step of:
discharging substantially oil free water overboard from said tertiary separation tank.

* * * * *